United States Patent
Kershaw et al.

(10) Patent No.: US 9,352,503 B2
(45) Date of Patent: May 31, 2016

(54) IN AN INJECTION MOLDING MACHINE, A METHOD OF CONTROLLING A MELT ACCUMULATOR

(75) Inventors: Michael David Kershaw, Brampton (CA); Kevin Wing Hang Leung, Toronto (CA); Mark Aaron McDonald, Bolton (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 459 days.

(21) Appl. No.: 13/574,402

(22) PCT Filed: Jan. 19, 2011

(86) PCT No.: PCT/CA2011/050025
§ 371 (c)(1),
(2), (4) Date: Jul. 20, 2012

(87) PCT Pub. No.: WO2011/103675
PCT Pub. Date: Sep. 1, 2011

(65) Prior Publication Data
US 2012/0306113 A1    Dec. 6, 2012

Related U.S. Application Data

(60) Provisional application No. 61/307,552, filed on Feb. 24, 2010.

(51) Int. Cl.
*B29C 45/54* (2006.01)
*B29C 45/76* (2006.01)

(52) U.S. Cl.
CPC ............... *B29C 45/76* (2013.01); *B29C 45/542* (2013.01); *B29C 45/544* (2013.01);
(Continued)

(58) Field of Classification Search
CPC ............... B29C 2945/76682; B29C 2945/762; B29C 2945/76207; B29C 2945/76678; B29C 2945/76204; B29C 2945/76685; B29C 2945/76575; B29C 2045/545

USPC ............... 264/40.1, 40.4, 40.7, 328.4, 328.8; 425/145, 561, 544, 557, 558, 147, 148; 700/281, 200, 204
See application file for complete search history.

(56) References Cited

U.S. PATENT DOCUMENTS 3,870,445 A    3/1975 Hold et al.
3,937,776 A    2/1976 Hold et al.
(Continued)

FOREIGN PATENT DOCUMENTS

DE    19505984 A1    8/1996
EP    1034912 A1    9/2000
(Continued)

OTHER PUBLICATIONS

PCT International Search Report, Branka Ristovski, Apr. 15, 2011, 3 pages.
(Continued)

*Primary Examiner* — Jeffrey Wollschlager
*Assistant Examiner* — Armand Melendez

(57) ABSTRACT

According to embodiments, there is provided a method (300) of controlling a first melt accumulator (121). The first melt accumulator (121) is part of an injection unit (100), the injection unit (100) including an extruder (102) for preparing molding material and a second melt accumulator (123). The first melt accumulator (121) and the second melt accumulator (123) are configured to sequentially receive molding material from the extruder (102). The extruder (102) is being operable to produce molding material in at least near continuous manner, both the first melt accumulator (121) and the second melt accumulator (123) being associated with a respective shot size set-point. The method comprises detecting (310) an indication of an out-of-boundary condition associated with operation the first melt accumulator (121); responsive to said detecting (310), controlling (320) the first melt accumulator (121) to continue accepting molding material beyond its respective shot size set-point.

7 Claims, 3 Drawing Sheets

(52) U.S. Cl.
CPC .............. *B29C 45/768* (2013.01); *B29C 45/54* (2013.01); *B29C 2045/545* (2013.01); *B29C 2945/76163* (2013.01); *B29C 2945/76204* (2013.01); *B29C 2945/76354* (2013.01); *B29C 2945/76367* (2013.01); *B29C 2945/76381* (2013.01); *B29C 2945/76384* (2013.01); *B29C 2945/76575* (2013.01); *B29C 2945/76652* (2013.01); *B29C 2945/76678* (2013.01); *B29C 2945/76682* (2013.01); *B29C 2945/76685* (2013.01); *B29C 2945/76832* (2013.01); *B29C 2945/76846* (2013.01); *B29C 2945/76943* (2013.01)

(56) References Cited

U.S. PATENT DOCUMENTS

| | | | |
|---|---|---|---|
| 4,094,940 A | 6/1978 | Hold | |
| 4,311,446 A | 1/1982 | Hold et al. | |
| 5,454,995 A * | 10/1995 | Rusconi et al. | 264/328.8 |
| 6,109,909 A * | 8/2000 | Morita | B29C 45/54 266/328.19 |
| 6,241,932 B1 * | 6/2001 | Choi et al. | 264/328.8 |
| 6,514,440 B1 | 2/2003 | Kazmer et al. | |
| 2002/0168444 A1 * | 11/2002 | Kohler et al. | 425/558 |
| 2008/0290541 A1 * | 11/2008 | Baumann | 264/40.6 |
| 2009/0045538 A1 * | 2/2009 | Craig et al. | 264/40.4 |

FOREIGN PATENT DOCUMENTS

| | | |
|---|---|---|
| JP | H02281919 A | 11/1990 |
| WO | 9511122 A1 | 4/1995 |
| WO | 2009021315 A1 | 2/2009 |
| WO | 2010142015 A1 | 12/2010 |

OTHER PUBLICATIONS

European Search Report, Dec. 4, 2014, 7 pages.

* cited by examiner

IN AN INJECTION MOLDING MACHINE, A METHOD OF CONTROLLING A MELT ACCUMULATOR

TECHNICAL FIELD

The present invention generally relates to, but is not limited to molding of molded articles and more specifically, but not limited to, a method of controlling a melt accumulator.

BACKGROUND

Molding is a process by virtue of which a molded article can be formed from molding material (such as Polyethylene Terephthalate (PET), Polypropylene (PP) and the like) by using a molding system. Molding process (such as injection molding process) is used to produce various molded articles. One example of a molded article that can be formed, for example, from PET material is a preform that is capable of being subsequently blown into a beverage container, such as, a bottle and the like.

A typical injection molding system includes inter alia an injection unit, a clamp assembly and a mold assembly. The injection unit can be of a reciprocating screw type or of a two-stage type. Within the reciprocating screw type injection unit, raw material (such as PET pellets and the like) is fed through a hopper, which in turn feeds an inlet end of a plasticizing screw. The plasticizing screw is encapsulated in a barrel, which is heated by barrel heaters. Helical (or other) flights of the screw convey the raw material along an operational axis of the screw. Typically, a root diameter of the screw is progressively increased along the operational axis of the screw in a direction away from the inlet end.

As the raw material is being conveyed along the screw, it is sheared between the flights of the screw, the screw root and the inner surface of the barrel. The raw material is also subjected to some heat emitted by the barrel heaters and conducted through the barrel. As the shear level increases in line with the increasing root diameter, the raw material, gradually, turns into substantially homogenous melt. When a desired amount of the melt is accumulated in a space at discharge end of the screw (which is an opposite extreme of the screw vis-à-vis the inlet end), the screw is then forced forward (in a direction away from the inlet end thereof), forcing the desired amount of the melt into one or more molding cavities. Accordingly, it can be said that the screw performs two functions in the reciprocating type injection unit, namely (i) plasticizing of the raw material into a substantially homogeneous melt and (ii) injecting the substantially homogeneous melt into one or more molding cavities.

The two stage injection unit can be said to be substantially similar to the reciprocating type injection unit, other than the plasticizing and injection functions are separated. More specifically, an extruder screw, located in an extruder barrel, performs the plasticizing functions. Once a desired amount of the melt is accumulated, it is transferred into a melt accumulator, which is also sometimes referred in the industry as a "shooting pot", the melt accumulator being equipped with an injection plunger, which performs the injection function.

U.S. Pat. No. 6,241,932 issued to Choi et al. on Jun. 5, 2001 discloses a method and system of operating a two stage injection molding machine wherein movement of the injection plunger in the shooting pot is coordinated with movement of the plasticizing screw and melt flow into the shooting pot such that the plunger provides minimal resistance to the melt flow into the shooting pot while avoiding the production of voids or air inside the melt. The undesired shear forces to which the melt is exposed are thus reduced, correspondingly reducing the melt degradation products which would otherwise result.

U.S. Pat. No. 6,514,440 to Kazmer, et al. issued on Feb. 4, 2003 discloses an injection molding apparatus, system and method in which the rate of material flow during the injection cycle is controlled. According to one preferred embodiment, a method of open-mold purging is provided in an injection molding system including a manifold to receive material injected from an injection molding machine. The method includes the steps of selecting a target purge pressure; injecting material from the injection molding machine into the manifold; and controlling the purge pressure to substantially track the target purge pressure, wherein the purge pressure is controllable independently from the injection molding machine pressure.

U.S. Pat. No. 4,311,446 to Hold et al. issued on Jan. 19, 1982; U.S. Pat. No. 4,094,940 to Hold on Jun. 13, 1978; U.S. Pat. No. 3,937,776 to Hold et al. on Feb. 10, 1976; and U.S. Pat. No. 3,870,445 to Hold et al. on Mar. 11, 1975 each teaches a method and apparatus for controlling the parameters of injection molding processes in a machine having a barrel with a plasticating chamber and a screw, rotatably and slidably disposed in said chamber, hopper means adjacent one end of said chamber communicating therewith and nozzle means disposed in the other end of said chamber communicating with a mold. Control of the injection molding process is achieved through an event recognition philosophy by sensing screw position, screw injection velocity, melt temperature, comparing the values at certain instances during the work cycle with known or desired values and using these values, changes of values and differences of values to monitor and initiate changes in the process parameters.

SUMMARY

According to a first broad aspect of the present invention, there is provided a method of controlling a first melt accumulator. The first melt accumulator is part of an injection unit, the injection unit including an extruder for preparing molding material and a second melt accumulator. The first melt accumulator and the second melt accumulator are configured to sequentially receive molding material from the extruder, the extruder being operable to produce molding material in at least near continuous manner. Both of the first melt accumulator and the second melt accumulator being associated with a respective shot size set-point. The method comprises detecting an indication of an out-of-boundary condition associated with operation the first melt accumulator; responsive to said detecting, controlling the first melt accumulator to continue accepting molding material beyond its respective shot size set-point.

According to a second broad aspect of the present invention, there is provided a method of controlling a first melt accumulator. The first melt accumulator is part of an injection unit, the injection unit including an extruder for preparing molding material. The first melt accumulator is configured to receive molding material from the extruder and to inject the molding material into a molding cavity. The extruder is operable to produce molding material in at least near continuous manner. The first melt accumulator is associated with a respective shot size set-point. The method comprises detecting an indication of an out-of-boundary condition associated with operation the first melt accumulator; responsive to said detecting, controlling the first melt accumulator to continue accepting molding material beyond its respective shot size set-point.

DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
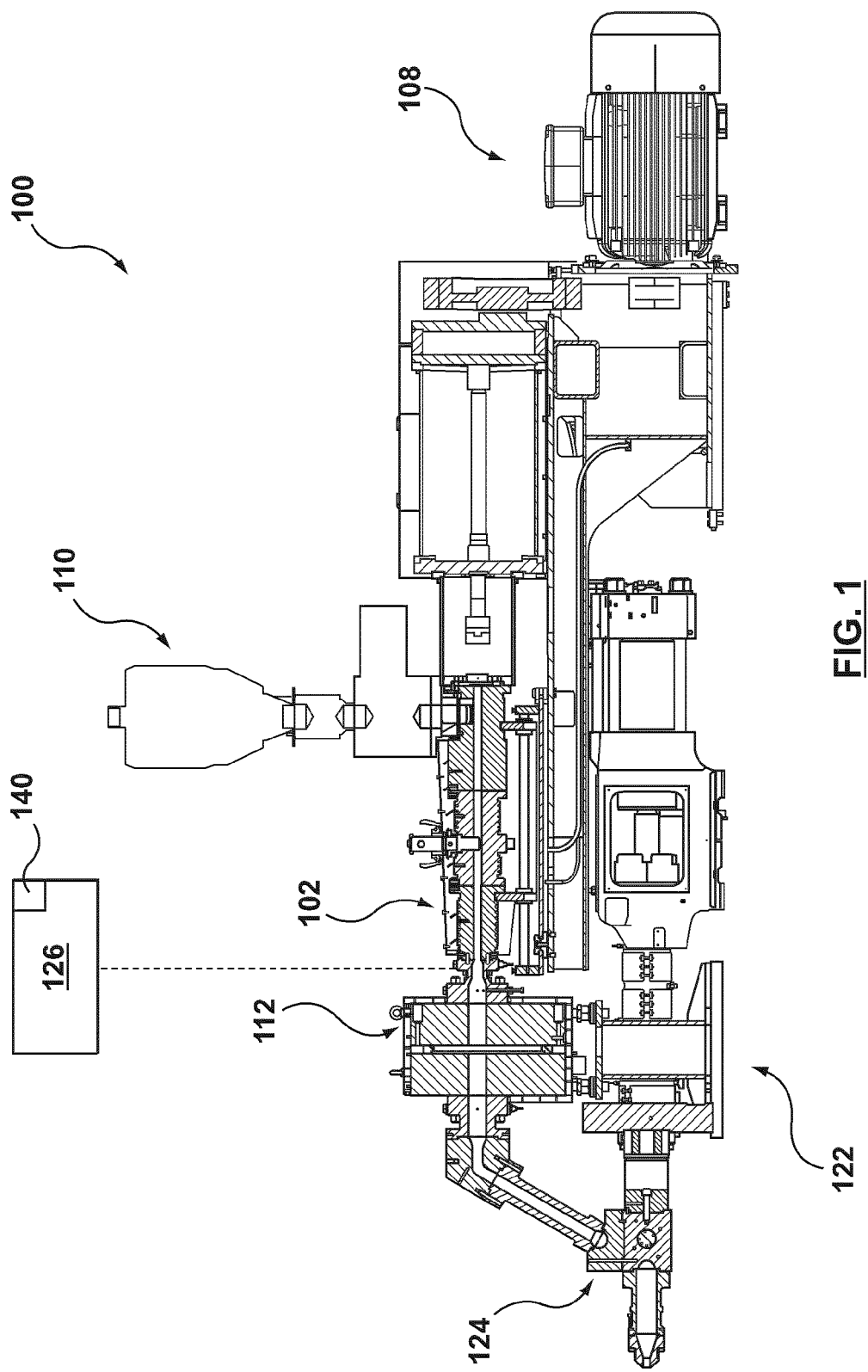
FIG. 1 depicts a partially sectioned frontal view of an injection unit implemented according to a non-limited embodiment of the present invention.
Figure 2:
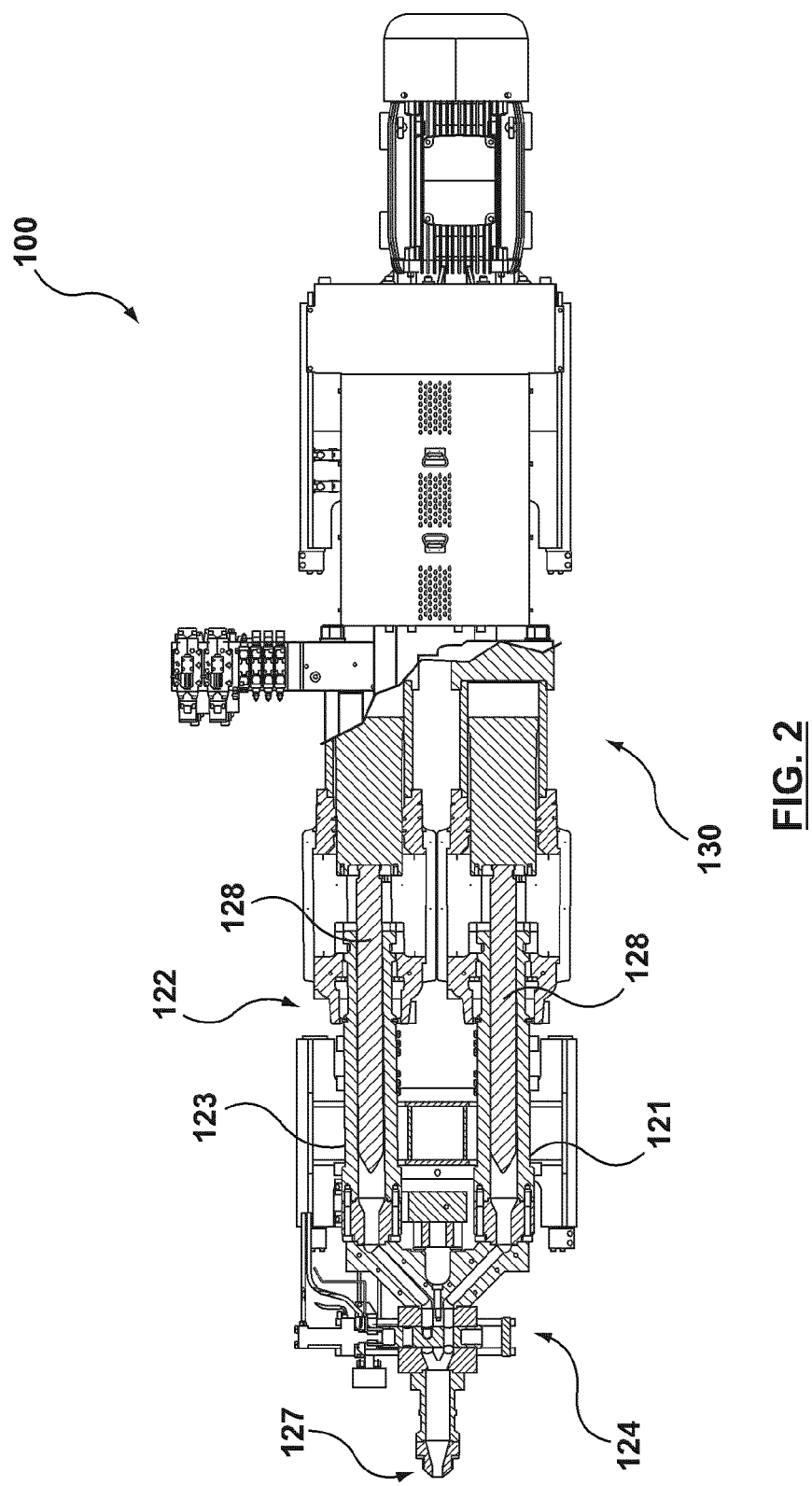
FIG. 2 depicts a partially sectioned top view of the injection unit of FIG. 1.

With reference to FIG. 1 and FIG. 2, an injection unit 100 implemented in accordance with non-limiting embodiments of the present invention, will now be described in greater detail, in which figures, FIG. 1 depicts a partially sectioned frontal view of the injection unit 100 and FIG. 2 depicts a partially sectioned top view of the injection unit 100.

Within the instantly illustrated embodiment, the injection unit 100 is of a two-stage type and to that extent, the injection unit 100 comprises an extruder 102 and a melt accumulator 122. The extruder 102 houses a screw (not depicted) for plasticizing raw material, as will be described in greater detail herein below. In some embodiments of the present invention, the extruder 102 can be implemented as a twin screw extruder and, to that end, the extruder 102 can house a set of two screws (not depicted). The extruder 102 (or to be more precise, the screw within the extruder 102) is actuated by a screw actuator 108. In the specific non-limiting embodiment of the present invention, the screw actuator 108 comprises an electric motor coupled to the extruder 102 via a gear box (not separately numbered); however, this need not be so in every embodiment of the present invention. As such, it should be appreciated that the screw actuator 108 can be implemented differently, such as a hydraulic actuator, a mechanical actuator or a combination thereof. It should be noted that in alternative non-limiting embodiments, the injection unit 100 can be implemented as a single-stage injection unit with a reciprocating screw.

In some embodiments of the present invention, the extruder 102 can operate in a continuous plasticizing manner (i.e. extruder 102 can be implemented as a continuous extruder). In other embodiments, the extruder 102 can operate in a near continuous plasticizing manner.

In the specific non-limiting embodiment depicted herein, the screw actuator 108 imparts a rotational movement onto the screw of the extruder 102 and it is this rotational movement that performs a dual function: (a) plasticizing of the raw material and (b) transfer of the raw material into the melt accumulator 122, as will be described in greater detail herein below. As such, within this implementation, the screw of the extruder 102 is not associated with a reciprocal movement. In alternative embodiments, however, which are particularly applicable but not limited to scenarios where a single screw is employed in the extruder 102, the screw of the extruder 102 can be associated with the reciprocal movement, which can be imparted by the screw actuator 108 or by separate means (not depicted).

The injection unit 100 further includes a material feeder 110. The material feeder 110 is configured to supply raw material to the extruder 102. The material feeder 110 can be configured as a controlled (or metered) feeder or as a continuous feeder.

In a specific non-limiting embodiment of the present invention, the raw material is PET. In alternative embodiments, other materials or a mix of materials can be used. In a particular implementation of the embodiments of the present invention, the raw material includes a combination of virgin raw material and recycled raw material, in a particular proportion. The virgin raw material (which can come in a form of pellets, for example) and the recycled raw material (which can come in a form of flakes, for example) can be mixed at the material feeder 110 or at another upstream device (not depicted), such as a drier (not depicted), for example.

In a particular scenario, the raw material fed through the material feeder 110 may include 25% of the recycled raw material and 75% of the virgin raw material. In another particular scenario, the raw material may include 50% of the recycled raw material and 50% of the virgin raw material. In yet another particular scenario, the raw material may include 75% of the recycled raw material and 25% of the virgin raw material. Naturally, the exact combination of the raw material used can be different. It should be further noted that embodiments of the present invention can be applied to the injection unit 100 that processes only virgin raw material or only recycled raw material.

In addition to the material feeder 110, in some embodiments of the present invention, there may be provided an additive feeder (not depicted) for adding additional substances, such as for example colorants, acetaldehyde (AA) blockers and the like, to the extruder 102. Such additive feeders are well known in the art and, as such, will not be described here at any length.

There is also provided a filter 112, located fluidly in-between the extruder 102 and the melt accumulator 122. The purpose of the filter 112 is to filter impurities and other foreign matters from the plasticized material being transferred from the extruder 102 to the melt accumulator 122. It should be noted that in some embodiments of the present invention, which include but are not limited to scenarios where only virgin raw material is used, the filter 112 can be omitted. The specific implementation for the filter 112 is not specifically limited and, as an example, an off-the-shelf filter from Gneuss Inc. of Matthews, N.C. (www.gneuss.com) can be used to implement the filter 112.

Within the specific non-limiting embodiment being depicted herein, the melt accumulator 122 is implemented as a dual melt accumulator and to that extent the melt accumulator 122 can include two instances of the melt accumulator 122—a first melt accumulator 121 and a second melt accumulator 123, selectively fluidly coupled to the extruder 102, as will be described in greater detail herein below. In alternative non-limiting embodiments of the present invention, the melt accumulator 122 can include only a single instance of the melt accumulator 122.

Each of the first melt accumulator 121 and the second melt accumulator 123 includes an injection plunger 128 operatively disposed within the respective one of the first melt accumulator 121 and the second melt accumulator 123. The injection plunger 128 is actuated by a respective one of an injection plunger actuator 130, which in this particular embodiment of the present invention is implemented as a piston which actuates the injection plunger 128 via hydraulic means. However, in alternative non-limiting embodiments of the present invention, the injection plunger 128 can be actuated by a different type of an actuator (not depicted), such as mechanical actuator, electrical actuator and the like.

There is also provided a distribution assembly 124, located fluidly-in-between the extruder 102 and the melt accumulator 122, downstream from the filter 112. The distribution assembly 124 is implemented as a distribution valve and is configured to selectively fluidly connect:

(a) the extruder 102 to the first melt accumulator 121 while connecting the second melt accumulator 123 to a nozzle 127, which provides for fluid communication with a molding cavity (not depicted) either directly or via a melt distribution system (not depicted), such as a hot runner (not depicted) for enabling for melt transfer from the extruder 102 to the first melt accumulator 121 and melt injection from the second melt accumulator 123 into the molding cavity (not depicted) via the nozzle 127;

(b) the extruder 102 to the second melt accumulator 123 while connecting the first melt accumulator 121 to the nozzle 127, for enabling for melt transfer from the extruder 102 to the second melt accumulator 123 and melt injection from the first melt accumulator 121 into the molding cavity (not depicted) via the nozzle 127.

Each of the first melt accumulator 121 and the second melt accumulator 123 is associated with a respective shot size set-point. The shot size set-point is generally set by keeping two variables in consideration: (a) the amount of molding material required for injection and filling; and (b) amount of time required to fill the given one of the first melt accumulator 121 and the second melt accumulator 123 given the throughput and the allocated transfer time. Within a typical prior art implementation, when the shot size set-point is reached for the given one of the first melt accumulator 121 and the second melt accumulator 123, but the transfer is still not completed (for example, when the other one of the first melt accumulator 121 and the second melt accumulator 123 is still performing injection or holding operation) an alarm would be triggered and the operation of the injection unit 100 would generally be interrupted. This of course, would result in lost productivity.

Also, provided within the architecture of FIG. 1 and FIG. 2 is a controller 126 (only depicted in FIG. 1 for the sake of simplicity). Controller 126 can be implemented as a general-purpose or purpose-specific computing apparatus that is configured to control one or more operations of the injection unit 100. It is also noted that the controller 126 can be a shared controller that controls operation of an injection molding machine (not depicted) that houses the injection unit 100 and/or other auxiliary equipment (not depicted) associated therewith.

Amongst numerous functions that can be controlled by the controller 126, some include (but are not limited to):

Controlling the screw actuator 108 and more specifically the speed of rotation of the screw (not depicted) of the extruder 102;

Controlling the distribution assembly 124 for selectively implementing the melt transfer and melt injection switching between the two instances of the melt accumulator 122, as has been discussed above;

Controlling the material feeder 110, where the material feeder 110 is implemented as controlled feeder, also referred to sometimes by those of skill in the art as a volumetric feeder;

Controlling the above-mentioned additive feeder (not depicted) in those embodiments where such additive feeder is provided;

Controlling other auxiliary equipment (not depicted), such as a dryer and the like;

Performing a cycle optimization routine configured to analyze and optimize different parameters of the molding cycle.

The controller 126 can comprise internal memory 140 configured to store one or more instructions for executing one or more routines. The internal memory 140 can also store and/or update various parameters, such as but not limited to:

(i) Indication of a target throughput for the transfer of molding material between the extruder 102 and the melt accumulator 122.

(ii) Set up parameters associated with the injection unit 100 or components thereof.

Given the architecture described with reference to FIG. 1 and FIG. 2, it is possible to execute a method for controlling a melt accumulator.

Figure 3:
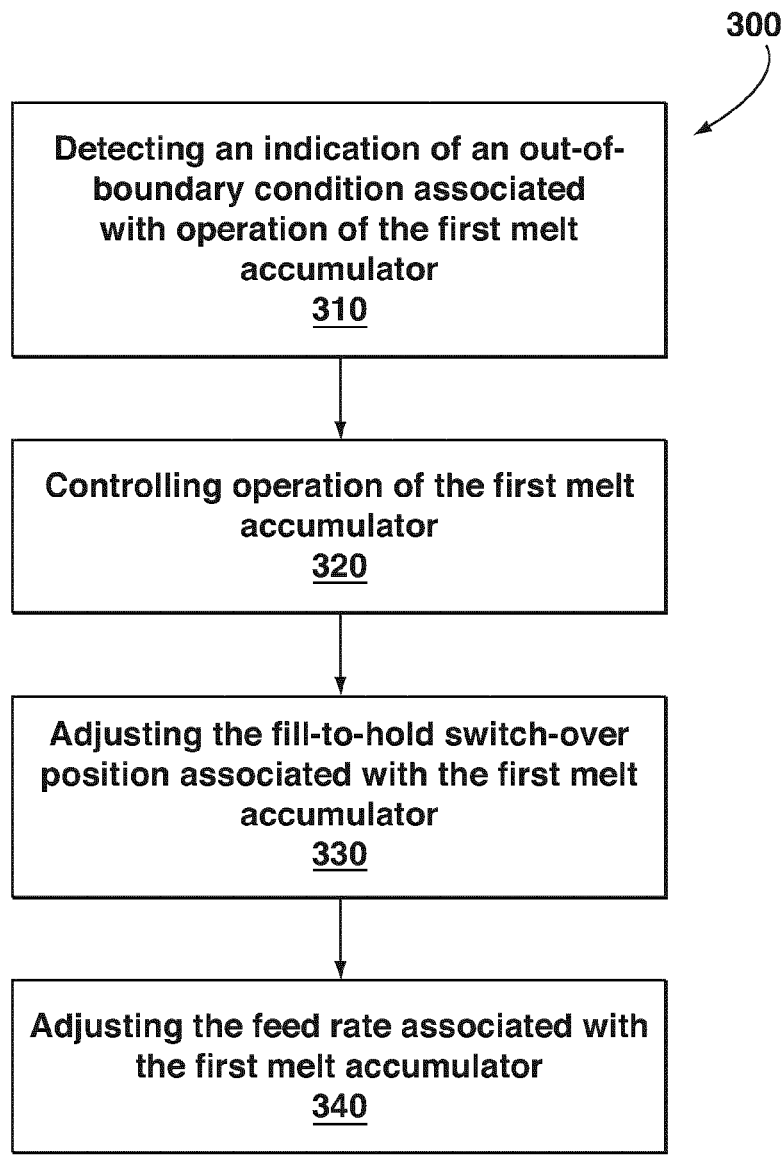
FIG. 3 depicts a flow chart showing steps of a non-limiting embodiment of a method for controlling a melt accumulator, the method being implemented in accordance with a non-limiting embodiment of the present invention.

Within embodiments of the present invention, the controller 126 can execute the method for controlling the melt accumulator. With reference to FIG. 3, which depicts a flow chart demonstrating a non-limiting embodiment of a method 300 executed in accordance with a non-limiting embodiment of the present invention, the method 300 will now be described in greater detail.

Step 310

The method 300 starts at step 310, where the controller 126 detects an indication of an out-of-boundary condition associated with operation of one of the first melt accumulator 121 and the second melt accumulator 123.

For example, in those embodiments of the present invention, there the melt accumulator 122 is implemented as the first melt accumulator 121 and the second melt accumulator 123, this indication of the out-of-boundary condition can be triggered by the one of the first melt accumulator 121 and the second melt accumulator 123 having reached the shot size set-point during a given transfer cycle, while the other one of the first melt accumulator 121 and the second melt accumulator 123 is not yet ready to start accepting molding material. This can occur, for example, when the other one of the first melt accumulator 121 and the second melt accumulator 123 has not yet completed its respective filling or holding operations.

In embodiments of the present invention where the melt accumulator 122 comprises only a single instance thereof, the indication of the out-of-boundary condition can be triggered responsive to the cycle time variations, bulk density variation of the raw material and the like.

For the purposes of the description to be provided herein below, it shall be assumed that the indication of the out-of-boundary condition is association with the first melt accumulator 121.

Step 320

Responsive to the detection of the indication received as part of step 310, the controller 126 proceeds to execution of step 320, during which the controller 126 executes control of the first melt accumulator 121. More specifically, within embodiments of the present invention, the controller 126 effectively overrides the shot size set-point and causes the filling operation of the first melt accumulator 121 to continue beyond the over-ridden shot size set-point.

Execution of step 320 continues until the second melt accumulator 123 is ready to accept molding material. When the second melt accumulator 123 is ready to accept molding material, the controller 126 causes the distribution assembly

124 to shuttle to a position where it operatively fluidly connects the extruder 102 to the second melt accumulator 123.

Step 330

The controller 126 then proceeds to execution of step 330, where the controller 126 adjusts the fill-to-hold switch-over position associated with the first melt accumulator 121 for the purposes of executing the next injecting and holding cycles of the first melt accumulator 121. This adjustment is performed in order to compensate for the over-filling executed as part of step 320. It is noted that step 330 is optional in some embodiments of the present invention. For example, in those embodiments where the transition between filling and holding is executed based on hydraulic pressure or time, step 330 can be modified or omitted altogether.

Step 340

The controller 126 then proceeds to executing step 340, where the controller 126 adjusts the feed rate, i.e. the rate at which molding material is transferred from the extruder 102 to the first melt accumulator 121 to eventually bring the shot size set-point associated with the first melt accumulator 121 to the pre-adjusted value that it was at prior to the adjustment executed as part of step 320. This eventual adjustment to the original shot size set-point can be achieved in one cycle or over two or more cycles depending on specific implementation and magnitude of the adjustment executed as part of step 320.

A technical effect of embodiments of the present invention includes ability to address disruptions to the melt buffering process that are transient in nature. It is noted that execution of the method 300 can be activated during the totality of operation of the injection unit 100 or, alternatively, it can be triggered on-demand. This on-demand triggering can be executed using, for example, a human-machine interface (not depicted) or any other suitable means.

The description of the embodiments provides examples of the present invention, and these examples do not limit the scope of the present invention. The concepts described above may be adapted for specific conditions and/or functions, and may be further extended to a variety of other applications that are within the scope of the present invention. Having thus described the embodiments, it will be apparent that modifications and enhancements are possible without departing from the concepts as described. Therefore, what is to be protected by way of letters patent are limited only by the scope of the following claims:

The invention claimed is:

1. A method of controlling a first melt accumulator, the first melt accumulator being part of an injection unit, the injection unit including an extruder for preparing molding material and a second melt accumulator, the first melt accumulator and the second melt accumulator configured to sequentially receive molding material from the extruder, the extruder being operable to produce molding material in at least near continuous manner, both the first melt accumulator and the second melt accumulator being associated with a respective shot size set-point; the method comprising:

detecting an indication of an out-of-boundary condition of the first melt accumulator accepting molding material, wherein the indication of the out-of-boundary condition is arranged to be triggered by the first melt accumulator having reached the shot size set-point during a given transfer cycle, while the second melt accumulator is not yet ready to start accepting molding material;

responsive to said detecting, controlling the first melt accumulator to continue accepting molding material beyond its respective shot size set-point until the second melt accumulator is ready to accept molding material; and adjusting a fill-to-hold switch-over position of a plunger of the first accumulator at which the first accumulator transitions from a filling operation to a holding operation responsive to over-filling of the first melt accumulator beyond its respective shot size set-point.

2. The method of claim 1, wherein the second melt accumulator is not ready to accept molding material by virtue of it not having finished one of filling or holding operation.

3. The method of claim 1, further comprising controlling a distribution assembly to enable the second melt accumulator to accept the molding material.

4. The method of claim 1, further comprising adjusting a feed rate associated with the first melt accumulator.

5. The method of claim 4, wherein said adjusting the feed rate is executed over one or more molding cycles.

6. The method of claim 1, wherein execution of said detecting is triggered on-demand.

7. The method of claim 1, wherein execution of said detecting can be executed during totality of operation of the injection unit.

* * * * *